(12) United States Patent
Kastner

(10) Patent No.: US 6,311,101 B1
(45) Date of Patent: Oct. 30, 2001

(54) METHOD OF OPERATING AN INJECTION MOLDING MACHINE

(75) Inventor: Engelbert Kastner, Perg (AT)

(73) Assignee: Engel Maschinenbau Gesellschaft m.b.H., Schwertberg (AT)

( * ) Notice: Subject to any disclaimer, the term of this patent is extended or adjusted under 35 U.S.C. 154(b) by 0 days.

(21) Appl. No.: 09/189,370

(22) Filed: Nov. 9, 1998

(30) Foreign Application Priority Data

Nov. 14, 1997 (EP) .................................................. 97119967
Oct. 16, 1998 (EP) .................................................. 98119594

(51) Int. Cl.$^7$ .............................. G06F 19/00; B29C 39/44
(52) U.S. Cl. .............................. 700/197; 700/17; 700/83; 700/180
(58) Field of Search .................................. 700/197, 180, 700/83, 51, 17, 2

(56) References Cited

U.S. PATENT DOCUMENTS

| | | | |
|---|---|---|---|
| 3,921,963 | * 11/1975 | Neff et al. ................................ | 366/78 |
| 4,826,418 | 5/1989 | Kamiguchi ............................ | 425/136 |
| 5,006,976 | * 4/1991 | Jundt ........................................ | 700/79 |
| 5,062,052 | 10/1991 | Sparer et al. .......................... | 700/197 |
| 5,297,257 | 3/1994 | Struger et al. .......................... | 760/83 |
| 5,301,120 | 4/1994 | Magario ................................. | 700/201 |
| 5,508,909 | * 4/1996 | Maxwell et al. ........................ | 700/18 |
| 5,805,442 | * 9/1998 | Crater et al. .............................. | 700/9 |
| 5,844,795 | * 12/1998 | Johnston et al. ........................ | 700/83 |
| 6,061,603 | * 5/2000 | Papadopoulos et al. ............... | 700/83 |
| 6,145,022 | * 11/2000 | Takizawa et al. ...................... | 710/10 |

FOREIGN PATENT DOCUMENTS

| | | |
|---|---|---|
| 19617181 | 12/1996 | (DE) . |
| 4175116 | 6/1992 | (JP) . |
| 4175132 | 6/1992 | (JP) . |
| 8-22494 | 1/1996 | (JP) . |
| 97-26587 | 7/1997 | (WO) . |

OTHER PUBLICATIONS

Article—ID No. XP–002095538—Virtual Java Devices Integration of Fieldbus Based Systems in the Internet—Thomas Lumpp, et al —pp. 176–181.
EPO—Patent Abstract of Japan—No. 09108999–Publ. Apr. 28, 1997, Mediator: . . . B.R. Gaines, et al.—pp. 964–969 (XP 000586326).

* cited by examiner

Primary Examiner—William Grant
Assistant Examiner—Paul Rodriquez
(74) Attorney, Agent, or Firm—Notaro & Michalos P.C.

(57) ABSTRACT

In a method of remote monitoring or remote maintenance of an injection molding machine which has an SPC with at least one CPU for the operation of actuators of the injection molding machine in real-time, data are transmitted between the injection molding machine and a remote monitoring or remote maintenance workstation disposed at a remote location. In addition to real-time control operation of the actuators of the injection molding machine the SPC of the injection molding machine operates as a web server, by way of which a simultaneous communication connection can be made with two or more remote monitoring or remote maintenance workstations, wherein a CPU of the SPC performs both real-time control operations of the injection molding machine and also server functions for remote monitoring or remote maintenance. In addition for data transmission between an SPC and an operating unit, having a microprocessor, of an injection molding machine, the SPC and the microprocessor of the operating unit can communicate by way of a local network in which the SPC forms a server and the operating unit forms a client.

18 Claims, 3 Drawing Sheets

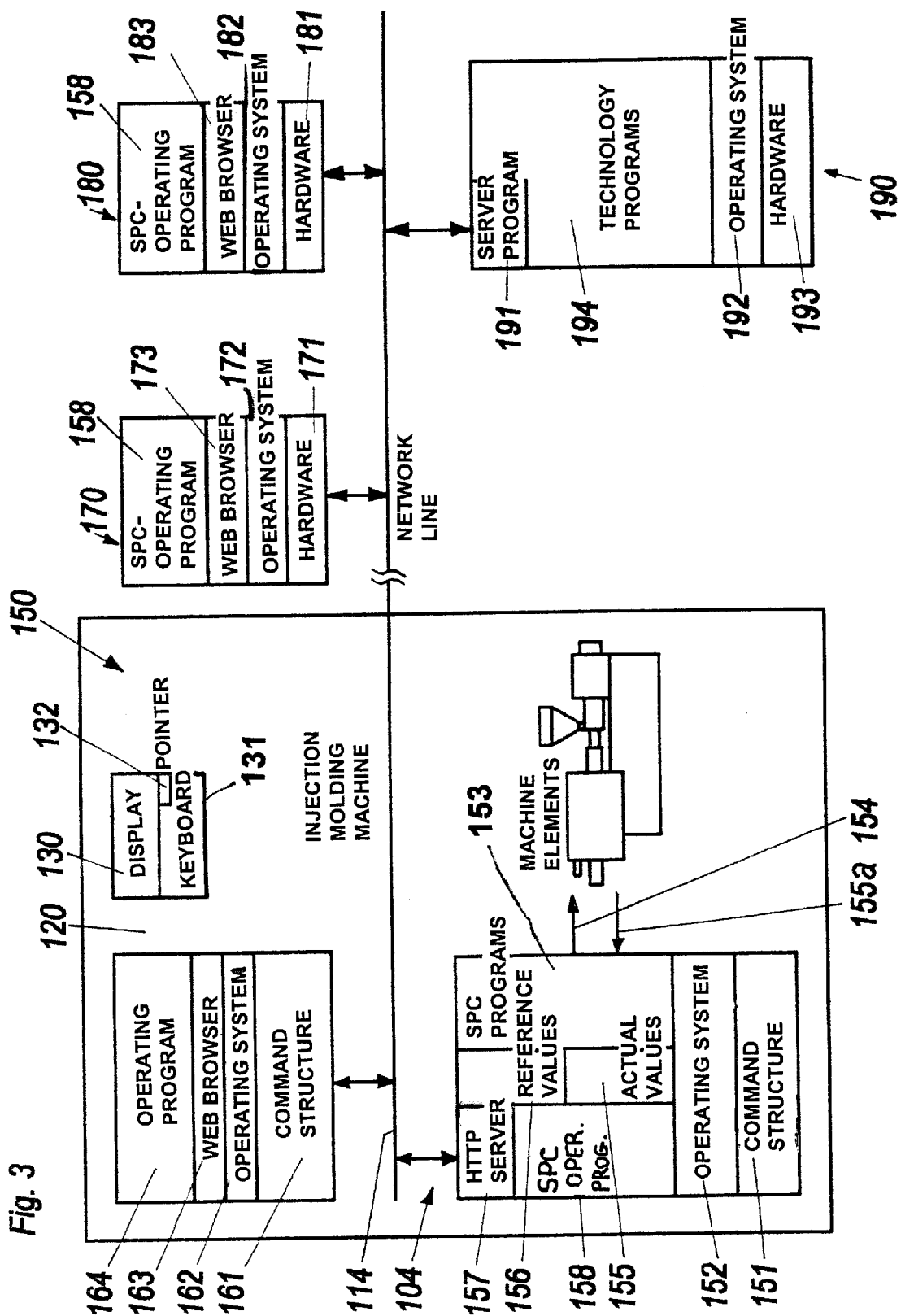

METHOD OF OPERATING AN INJECTION MOLDING MACHINE

Figure 1:
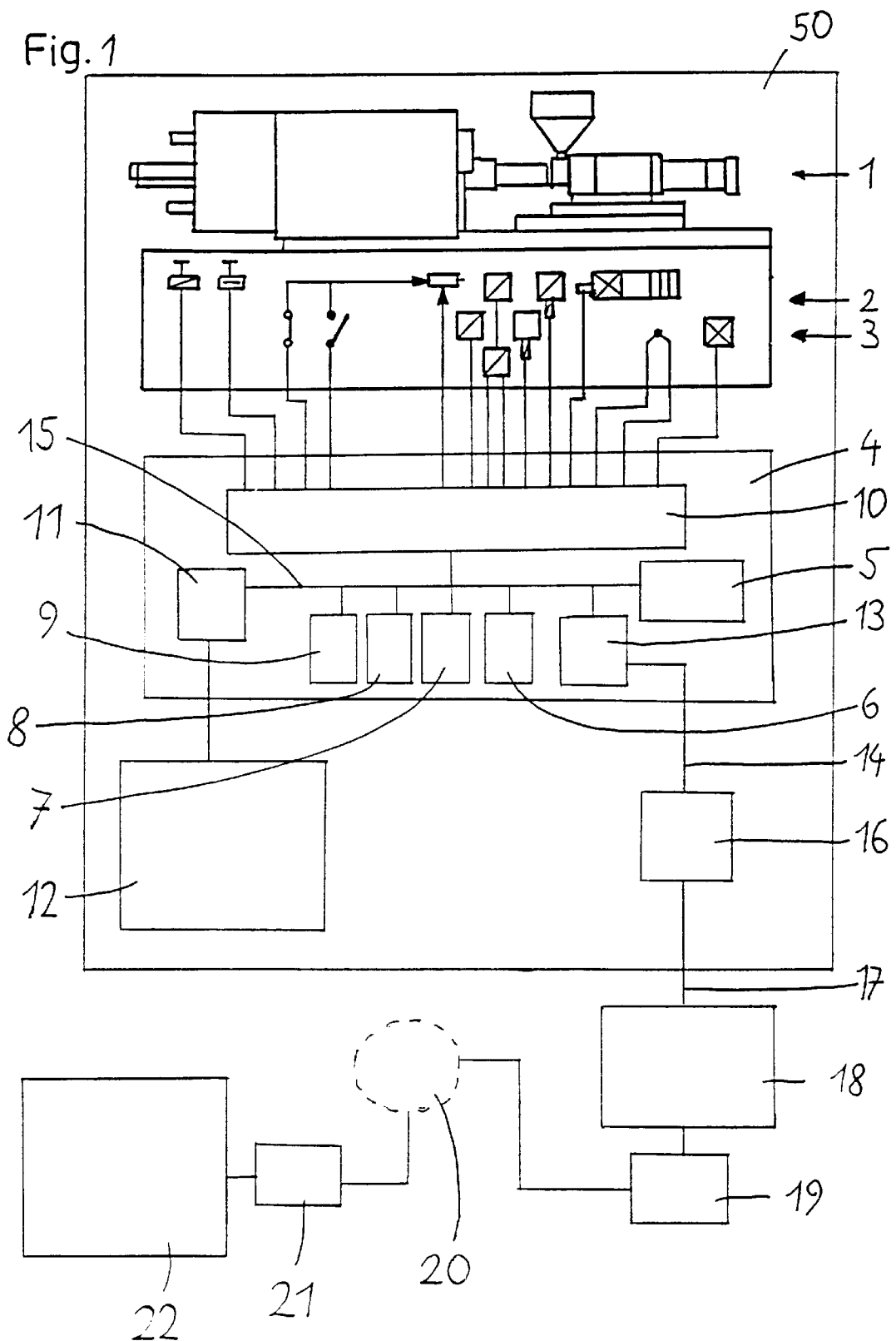

The invention is concerned with methods of operating injection molding machines.

More specifically the invention concerns a method of remote monitoring or remote maintenance of an injection molding machine which has an SPC (stored-programmable control) with at least one CPU (central processing unit) for operating the actuators of the injection molding machine in real-time. In such a method data are transmitted between the injection molding machine and a remote monitoring or remote maintenance workstation disposed at a remote location, and said data include process data of the injection molding process implemented by the injection molding machine and/or control parameters for process control of the injection molding machine.

The invention further concerns a method of data transmission between an SPC and an operating unit, having a microprocessor, of an injection molding machine, wherein the data transmission includes a transmission to the SPC of reference values of injection molding parameters, the reference values being inputted into the operating unit. In dependence on those reference values and actual values which are outputted to the SPC by sensor devices, the SPC outputs control signals to actuators of the injection molding machine.

The transmission of data to a workstation which is disposed at a location remote from the injection molding machine in order to implement remote monitoring or control or remote maintenance of the injection molding machine from that workstation is already known. For example U.S. Pat. No. 5,301,120 discloses data transmission from a plurality of injection molding machines to a monitoring or control computer. For that purpose, the usual procedure is to make a serial point-to-point data connection between the injection molding machine and the remotely disposed workstation, wherein modems and the telephone network can be used as the data line. A disadvantage with those systems is that software which is specifically adapted to the respective injection molding machine has to be previously installed at the remotely disposed workstation, to make the communication with the injection molding machine and to permit monitoring or control thereof.

It is known from WO 97/26587 to connect a production station by way of the Internet to external apparatuses, for example a programming apparatus. The production station has inter alia a plurality of SPCs (stored-programmable controls or PLCs) and servers, wherein a control program can be transmitted from the external programming apparatus by way of the Internet into an SPC of the production station.

An injection molding machine is provided with an operating unit for the display and input of data of the injection molding process. Besides operating units which do not have any "intelligence", that is to say a microprocessor, operating units are also known, which include a microprocessor on which run the programs which form the interface between man and machine. They are in particular programs for the display of process data which are detected by sensors of the injection molding machine and fed to the SPC as actual values, and programs for the input of reference or target values of injection molding parameters which are inputted into the operating unit and transmitted to the SPC. The SPC controls or regulates the actuators of the injection molding machine, in dependence on those reference values.

The connection between an SPC and an operating unit of an injection molding machine is conventionally effected by way of an internal parallel synchronous bus or, in the case of an "intelligent" operating unit, by way of a serial "point-to-point connection" between the microprocessor of the operating unit and the microprocessor of the SPC. Such serial "point-to-point connections" are afforded by a respective SIO (serial input-output) interface in the SPC and in the operating unit, wherein those SIO can be connected by way of a cable which is suitable for the specific nature of the SIO-interface. A plurality of internationally standardised serial connections are known, which make specific demands in terms of the SIO-interface and the cable used (for example the number of poles, length, material, screening).

It is further known in regard to rubber injection molding installations to connect a plurality of injection molding machines to a central computer to form a local network. That central computer can take over control functions and tasks of data input, data acquisition and data display. Each of the injection molding units which are connected together to form a local network in addition have an internal operating unit for local operation of the injection molding machine, wherein the internal connection between the SPC of the injection molding machine and the internal operating unit of the injection molding machine is effected in conventional manner.

An object of the present invention is to provide a method of remote monitoring or remote maintenance of an injection molding machine, with which the possibilities in terms of remote monitoring or remote maintenance are enlarged and by which the service expenditure and the costs for such a system are reduced.

A further object of the invention is to permit a simple and reliable kind of internal data transmission between the SPC and the operating unit of an injection molding machine. The invention further seeks to provide that a communication option with external apparatuses is provided by the manner according to the invention of the internal communication in the injection molding machine, in a simpler fashion than with the conventional injection molding machines.

In accordance with a first aspect of the invention the SPC of the injection molding machine, in addition to real-time operation of the actuators of the injection molding machine, operates as a web server, preferably an HTTP (hypertext transfer protocol)-server or an FTP (file transfer protocol)-server, by way of which it is possible to make a simultaneous communication connection with two or more remote monitoring or remote maintenance workstations, wherein a CPU of the SPC performs both real-time control operations of the injection molding machine and also server functions for remote monitoring or remote maintenance.

Therefore the injection molding machine does not require a separate server which is provided in addition to the SPC for communication with the remote monitoring or remote maintenance workstations, but that functionality is taken over directly by the SPC. Therefore, two completely different functionalities are implemented on the SPC, which hitherto were considered to be contradictory from the point of view of their character, these being more specifically operation of the injection molding machine which must be capable of being implemented in real-time, and the computing time- and memory-intensive communication tasks of a web server.

A further advantage of the method according to the invention is that the remote monitoring or remote maintenance workstations do not have to be especially prepared. The appropriate communication software can be stored in the SPC of the injection molding machine itself and can be called up from the remote monitoring or remote maintenance workstation by way of a standard communication protocol such as HTTP or FTP by the SPC. In that case the data connection can be made for example by way of the Internet.

In accordance with a further aspect of the invention the SPC of the injection molding machine and a microprocessor of the operating unit of the injection molding machine communicate by way of a local network, wherein the SPC forms a server and the operating unit forms a client in the local network. This aspect of the invention is therefore based on already providing a LAN (local area network)-architecture for internal data transmission within the injection molding machine, more specifically between the SPC and the operating unit of the injection molding machine. In terms of hardware, various types of such network architectures exist, for example the known Ethernet. Those network technologies are at a highly advanced stage and permit simple and effective communication on the basis of the client-server principle of the interconnected microprocessors, wherein the SPC itself performs the functionality of the server.

If the injection molding machine is to be connected to external computers, the "internal local network" of the injection molding machine, which is already present, can be used for simple connection of those external computers by way of an enlargement of the internal LAN, without the need for a further different type of communication hardware and software, as in the case of conventional injection molding machines. This unification according to the invention of internal and external communication therefore also provides that the connection of external components is significantly simplified and made substantially more flexible, in comparison with conventional injection molding machines. In addition it is possible to achieve compatibility with the Internet technology by use of the TCP/IP (transmission control protocol/internet protocol) transmission protocol. On the one hand that represents a wide-spread standard, while on the other hand operating computers (in particular for visualization purposes) or resources can be linked into the injection molding machine by way of the Internet.

It is to be noted that in accordance with the invention a local area network (LAN) is not used to mean a field bus system. A field bus is a sensor-actor-bus which is characterized by short data packets and real-time capability. In the case of a CAN (computer assisted network)-bus for example a maximum of 8 bytes useful data are transmitted per data packet, and that value is of the same order of magnitude in the case of other field bus systems. LANs in accordance with the invention, which are also referred to as a "standard-LAN" or an "office bus", in contrast have substantially longer data packets (of the order of magnitude of 1000 bytes for example in the case of the Ethernet) and they do not under any circumstances have real-time characteristics.

Figure 2:
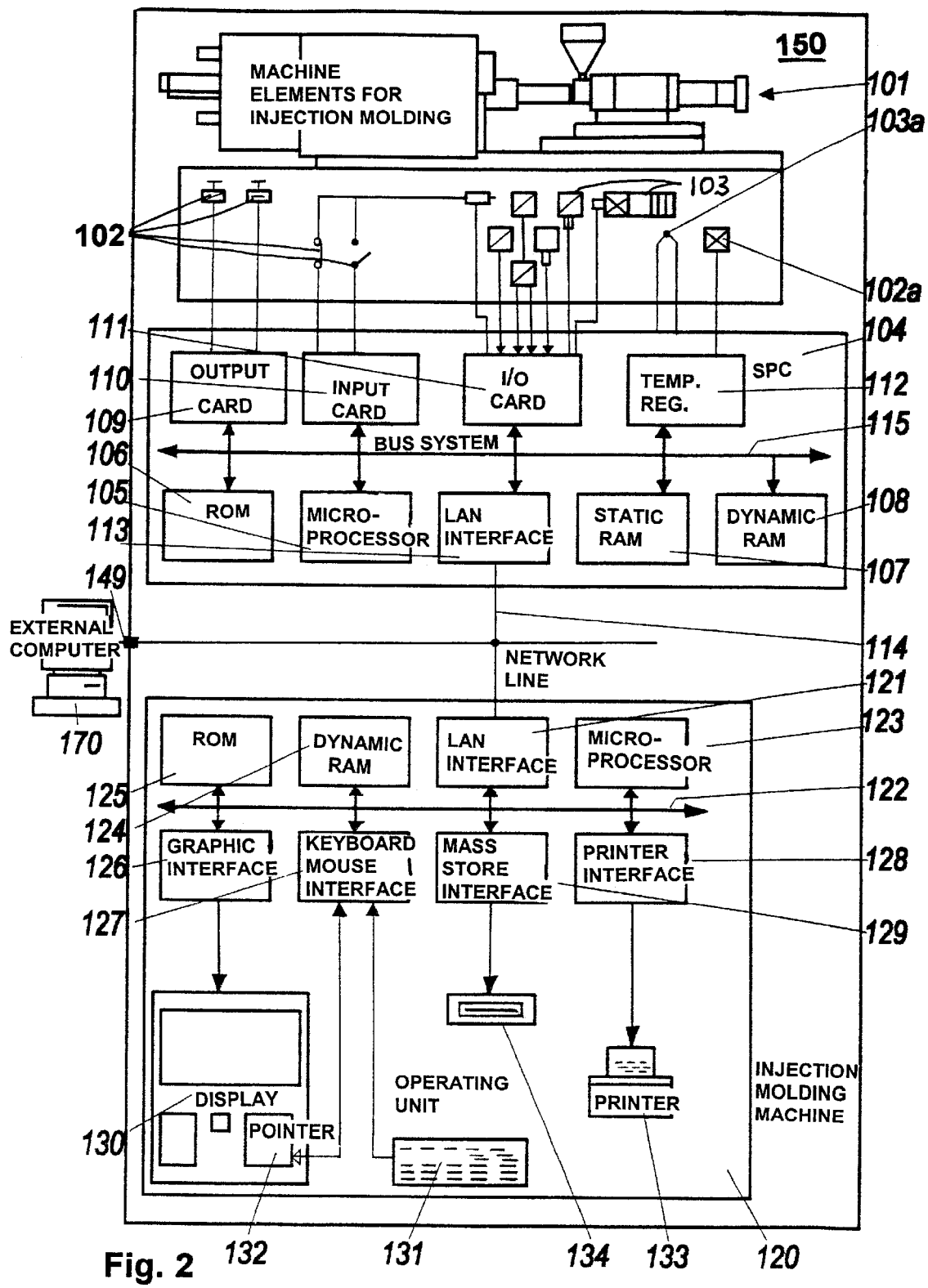

Further advantages and details will be described hereinafter with reference to the accompanying drawing in which:

FIG. 1 is a diagrammatic view of an injection molding machine which is connected to a remote monitoring or remote maintenance workstation, FIG. 2 is a block circuit diagram of an injection molding machine-corresponding to the second aspect of the invention, and FIG. 3 is a block circuit diagram to show the flow of information within the injection molding machine and to and from connected external computers.

The injection molding machine 50 diagrammatically illustrated in FIG. 1 includes the machine elements 1 which perform the actual injection molding process as well as actuators and sensors 2, 3, wherein the machine elements 1 can be operated by way of the actuators 2 and the actual values of the process parameters are detected by way of the sensors 3. For example, a heating circuit can be closed by way of a triac and the temperature of the granular material in the screw can be detected by way of a temperature sensor. Those parts 1, 2, 3 of the injection molding machine correspond to the state of the art and are not described in greater detail herein.

For operation of the actuators 2 of the injection molding machine there is provided an SPC 4 which has a single microprocessor or CPU 5. For control and regulation of the actuators 2 and for detecting the actual values of the sensors 3, the arrangement has inputs and outputs 10 which include for example a digital output card, a digital input card, an analog input/output card and a temperature regulator. The CPU 5, the input/outputs 10 and the further components 6 through 11, described hereinafter of the SPC 4 communicate by way of a local synchronous bus 15 or field bus (preferably a CAN-bus). The memory 6 contains SPC-programs, the memory 7 contains process data, the memory 8 contains operating and display programs and the memory 9 contains communication data files for communication of a remote monitoring or remote maintenance workstation with the injection molding machine. The memories 6 through 9 can be in the form of one or more physical memory components which can include static and dynamic RAM (random-access memory)-memories, flash memories and ROM (read-only memory)-memories. Upon starting of the injection molding machine data can be loaded from a permanent store (not shown) into one or more of the memories 6, 7, 8, 9.

The connection of the SPC to an operating and display apparatus 12 which includes a display screen and an input keyboard is made by way of an interface 11 of the SPC. The operating and display programs which are stored in the memory 8 and processed by the CPU 5 are provided for the input and display of data at the operating and display apparatus.

In addition the SPC has an interface 13 with a serial output. Connected thereto by way of serial data line 14 is a converting computer 16 which converts the serial data format into a networkable data format, preferably TCP/IP. In that way the injection molding machine 50 can be connected by way of a LAN (local area network) 17 to a gateway computer 18. In a further alternative configuration the gateway computer 18 can be omitted and the SPC directly serves the modem 19 by way of the interface 13 (preferably with the interconnection of a converting computer).

The software which runs in the gateway computer operates a modem 19 which is connected by way of the telephone network or the Internet (or global computing network) 20 to a modem 21 disposed at a remote location. The modem 21 in turn is connected to a remote monitoring or remote maintenance computer 22. Further such combinations of computers 22 and modems 21 can be provided at different locations.

Now, in accordance with the invention, in addition to real-time control operation of the actuators 2 of the injection molding machine, the SPC 4 operates as a web server, in which respect in particular the use of the HTTP or the FTP standard is preferred. Therefore the computer 22 does not have to be prepared with a software which is adapted to the specific injection molding machine 50, but only have a standard program such as an HTTP or FTP browser, for communication with such a web server. The specific communication data files to be used for remote monitoring or remote maintenance of the injection molding machine 50, preferably in the form of Java-Applets (stand-alone program embedded within web pages; programmed with programming language Java) or HTML (hypertext markup language)-data files are stored in the memory 9 of the SPC 4 itself and can be downloaded from the computer 22 into same. A plurality of such computers 22 can also simultaneously receive a communication connection to the SPC. In that respect, in the same period of time, the CPU 5 of the SPC effects both real-time control operations in respect of the injection molding machine and also server functions.

If the computer 22 is used as a remote monitoring computer, then process data of the injection molding process executed by the injection molding machine and/or control parameters for process control of the injection molding machine are displayed on its display screen. If the computer 22 is also used as a remote maintenance computer, then control parameters of the injection molding process which are stored in the memory 7 of the SPC 4 and/or operating and display programs stored in the memory 8 of the SPC 4 and/or SPC-programs stored in the memory 6 of the SPC 4 and/or communication data files stored in the memory 9 of the SPC 4 can be changed or transmitted into the respective memory, from the computer 22.

In principle it would also be conceivable and possible for the SPC, instead of a single CPU, to have a plurality of parallel CPUs or a central CPU and one or more auxiliary CPUs associated therewith. In those cases each of the parallel CPUs or the central CPU would virtually simultaneously execute the real-time control operations and also the server functions.

The block circuit diagram of an injection molding machine 150 illustrated in FIG. 2 again shows in diagrammatic form the machine elements 101 which perform the actual injection molding process, as well as the actuators and sensors 102, 103 wherein the machine elements 101 can be operated by way of the actuators and the actual values of the process parameters are detected by way of the sensors 103. For example a heating circuit can be closed by way of a triac 102a and the temperature of the granular material in the screw can be detected by way of a temperature sensor 103a. As those parts 101, 102, 103 of the injection molding machine correspond to the state of the art and are sufficiently known, they will not be discussed in further detail here.

To control the injection molding process the injection molding machine 150 has an SPC 104. It includes a microprocessor 105 (preferably an MIPS (million instructions per second)-processor), a ROM-memory 106, a static RAM-memory 107, a dynamic RAM-memory 108, a flash memory (not shown in FIG. 2) and a series of inputs and outputs, wherein the individual components communicate with each other by way of a local synchronous bus 115 or field bus (preferably a CAN-bus). A digital output card 109, a digital input card 110, an analog input/output card 111 and a temperature regulator 112 are provided to supply the outputs. The actuators 102 are addressed by way of the outputs and the actual values of the machine condition, which are detected by the sensors 103, are read in by way of the inputs. Such actual values are for example actual values in respect of travel distances, hydraulic pressures, internal mold pressures, temperatures, . . . the detected actual values are stored in the dynamic RAM-memory 108, and reference values of process and injection molding parameters are stored in the static RAM-memory. Examples of such injection molding parameters are reference travel positions, preset speed parameters, reference temperatures, . . . . The SPC-programs for controlling and regulating the injection molding process are stored in the ROM-memory 106 and in the flash memory.

The SPC further includes an LAN-interface 113 in the form of an Ethernet adaptor to which there is connected a network line 114 which is formed by an Ethernet cable. That network line 114 is connected to a further LAN-interface 121 of an operating unit 120, the LAN-interface 121 also being in the form of an Ethernet adaptor. In that respect, the LAN-interfaces 113, 121 and the network line can be in the form of standard Ethernet components or in the form of fast Ethernet components (with a transmission rate of 100 Mbits/s).

The LAN-interface 121 is connected by way of a local synchronous bus 122 to a microprocessor 123 (preferably an MIPS-processor) of the operating unit 120. Also connected to the local bus 122 are a dynamic RAM-memory 124, an ROM-memory 125, optionally a flash memory (not shown), a graphic interface 126, a keyboard mouse interface 127, a printer interface 128 and optionally a mass store interface 129. The ROM-memory 125 stores boot programs which are executed when the operating unit is switched on. Connected to the graphic interface 126 is a display device 130, connected to the keyboard mouse interface 127 are a keyboard 131 and a mouse or another pointer instrument 132, and connected to the printer interface 128 is a printer 133. If a mass store interface 129 is provided, a mass store 134 can be connected thereto.

It is to be noted that both the SPC 104 and also the operating unit 120 are integral components of the injection molding machine 150 and are fitted into a housing therein. The injection molding machine also has a connection 149 which is connected to the network cable 114 and which serves to connect the injection molding machine to one or more external computers 170, as will be described in greater detail hereinafter.

The flow of information within the injection molding machine will be described hereinafter with reference to FIG. 3. A real-time operating system 152 is superimposed on the command structure 151 of the microprocessor 105 of the SPC 104. Contained in the ROM-memory 106 and in the flash memory of the SPC 104 are the SPC-programs 153 forming the actual SPC-running control. The SPC-programs output control commands 154 to the actuators 102 and receive actual values 155 via actual value transmission 155a in respect of the process data, as input signals, from the sensor devices 103. In addition commands for machine control such as for example "machine off" or "machine on"or manual control commands can also be inputted by way of additional sensor inputs (not shown) of the SPC.

The data stored in the static RAM 107 of the SPC include reference values 156 in respect of the injection molding parameters. In dependence on those reference values 156 in respect of the injection molding parameters and the process actual values 155, which are outputted by the sensor devices 103, the SPC-programs 153 determine the output control commands 154 to be outputted to the actuators. The actual values 155 of the process can also be put into intermediate storage in the dynamic RAM 108 of the SPC 104.

A program by means of which the SPC 104 operates as a HTTP-server 157 runs in another time window of the real-time operating system 152. That HTTP-server 157 can be accessed by way of the network line 114 by a client program which runs on the operating unit 120 and which in this case is referred to a web browser. The TCP/IP protocol is used as the transport protocol for data transmission by way of the network line 114, thereby first permitting the use of the HTTP-transmission protocol for data transmission between the SPC 104 and the operating unit 120. That provides for compatibility of internal data transmission of the injection molding machine with Internet technology. In addition, stored in the static RAM 107 or in the flash memory are the SPC-operating programs 158 in the form of platform-independent Java programs, the function of which is described hereinafter.

The command structure 161 of the microprocessor 123 of the operating unit 120 is managed by an operating system 162. Operating under that operating system 162 is a web browser 163 with which the HTTP-server 157 can be addressed by way of the LAN-interfaces 113, 121 and the network line 114 so that the operating unit 120 becomes a client of the SPC 104 operating as a server. HTML-formatted documents can be loaded with a web browser. If that loading operation is implemented by way of a network connection the HTTP-transmission protocol is used. The web browser 163 also provides a function for the execution of Java programs, that is to say a "Java virtual machine". Accordingly operating programs 164 stored in the RAM-memory 124 of the operating unit can be loaded and executed, in the form of Java programs. Those operating programs can be loaded by the SPC 104, for example when starting the system. Therefore the SPC operating as a server provides its own operating programs which, besides the operating unit, can also be called up by another client connected to the injection molding machine as will be described in greater detail hereinafter. By means of those operating programs 164, data can be viewed at the display device 130 of the operating unit 120 and reference values can be inputted or selected by way of the keyboard 131 or the pointer instrument 132, in which case those reference values are transmitted by the operating program to the SPC. It is also possible for operating programs to be locally stored on the operating unit (for example on the mass store thereof) and also loaded from there by the browser.

By virtue of the internal network structure of the injection molding machine, it is possible in a simple manner for further operating computers 170, 180 which can serve in particular for the visualization of process data to be connected to the injection molding machine which for that purpose has the connection 149 (see FIG. 2). A connection between the injection molding machine 150 and the external operating computers 170, 180 can be made for example by way of modems and the telephone line. A connection to the Internet is also possible by way of a gateway computer (not shown). The respective hardware 171, 181 of those external operating computers 170, 180, like also the respective operating system 172, 182 can be selected as desired, as long as a suitable web browser 173, 183 is available, to provide a "Java virtual machine". The operating programs 158 stored in the SPC can again be loaded by the HTTP-server 157 of the SPC 104 by means of that web browser 173, 183 of the external operating computers 170, 180. As a result in principle all visualisation and data input tasks can be implemented at the external operating computers 170, 180. The input of reference values from external computers however is normally blocked to prevent injection molding machine operating errors.

It is also possible to connect an external computer 190 having a high level of computing capacity, which by way of a suitable server program 191 forms a further HTTP-server. Technology programs 194 which require a high level of computing capacity can be executed on that computer 190. Such technology programs are used for example for determining the reference values of the injection molding parameters for a given injection molding. Those technology programs can be accessed by way of the web browser 163 of the operating unit 120 of the injection molding machine, and therefore the user surface thereof can be displayed at the display device 130 of the operating unit, values can be inputted by way of the keyboard 131, and computation results can be outputted at the display device 130. In that way the computing capacity of the external computer 190 can be linked into the operating unit 120 of the injection molding machine. In that respect the hardware 193 and the operating system 192 of the external computer 190 can again be freely selected. That therefore in practice provides an injection molding machine whose operating unit has a computing capacity which in principle can be enlarged as desired, by virtue of linking in one or more external computers. In that way for example it is possible to carry out directly at the operating unit of the injection molding machine tasks for which hitherto the operator had to leave the workstation.

In addition it is desirable if an FTP-server and possibly a mail client run at the SPC-computer.

The FTP-server (FTP=File Transfer Protocol) permits connected clients to obtain complete data files from the SPC or send same thereto. Communication with the FTP-server or operation of the FTP-server is effected by means of the web browser of the clients. (For example: setting data sets, . . . .) The mail client installed on the SPC is intended to permit the user on the machine to receive or despatch mails. Those mails could contain inter alia operating indications or items of production status information.

In addition in a fault situation the SPC can automatically send mails with the corresponding items of additional information to defined addresses (for example servicing personnel). A prerequisite is an existing mail server in the network in which the injection molding machine is linked.

In principle it would also be possible to forego providing the operating programs 158 in the memory of the SPC. The operating programs would then have to be present completely in the memory of the operating unit and external connected computers would also have to have stored those operating programs (at least a part thereof) in order to visualise (or remotely operate) the SPC.

Various other modifications in the described injection molding machine and the described method of internal data transmission within an injection molding machine are conceivable and possible without departing from the scope of the invention. Thus for example a different kind of client-server architecture could be selected in place of the HTTP-server and web browser. Instead of the TCP/IP-transmission protocol it would be possible to use another transmission protocol of the local network. Other LAN-interfaces than the specified Ethernet adaptors can be selected. It would also be possible to provide additional internal components of the injection molding machine, which are connected to the "internal local network" of the injection molding machine.

What is claimed is:

1. A method of remote monitoring or remote maintenance of an injection molding machine which has a stored-programmable control with at least one central processing unit for operation of actuators of the injection molding machine in real-time, wherein data are transmitted between the injection molding machine and a remote monitoring or remote maintenance workstation disposed at a remote location, said data including process data of an injection molding process effected by the injection molding machine or control parameters for process control of the injection molding machine, and wherein the stored-programmable control of the injection molding machine, in addition to real-time operation of the actuators of the injection molding machine, operates as a web server, by way of which it is possible to make a simultaneous communication connection with two or more remote monitoring or remote maintenance workstations, a central processing unit of the stored-programmable control performing both real-time control operations of the injection molding machine and also server functions for remote monitoring or remote maintenance.

2. A method as set forth in claim 1 wherein the stored-programmable control operates as a hypertext transfer protocol-server.

3. A method as set forth in claim 1 wherein the stored-programmable control operates as a file transfer protocol-server.

4. A method as set forth in claim 1 wherein the stored-programmable control has only one central processing unit.

5. A method as set forth in claim 1 wherein the communication with the remote maintenance or remote monitoring workstation is effected by way of a global computing network.

6. A method as set forth in claim 1 wherein the data transmission is effected by way of a modem and a gateway computer which operates the modem and which is connected to the stored-programmable control.

7. A method as set forth in claim 6 wherein the data are outputted or received by the stored programmable control by way of a serial data line and wherein a converting computer connects said serial data line to a local network to which the gateway computer is connected.

8. A method as set forth in claim 1 wherein the data transmission is effected by means of a modem which is operated by an interface of the stored-programmable control.

9. A method as set forth in claim 1 wherein stored in the stored-programmable control are communication data files which are transmitted by the stored-programmable control upon being called up to the remote maintenance or remote monitoring workstation.

10. A method as set forth in claim 9 wherein the communication data files are stand-alone programs embedded within web pages and programmable with programming language Java.

11. A method as set forth in claim 9 wherein the communication data files are hypertext mark-up language-data files.

12. An injection molding machine which has a stored-programmable control with at least one central processing unit for operation of actuators of the injection molding machine in real-time, wherein data are transmitted between the injection molding machine and a remote monitoring or remote maintenance workstation disposed at a remote location, said data including process data of an injection molding process effected by the injection molding machine or control parameters for process control of the injection molding machine, and wherein the stored-programmable control of the injection molding machine, in addition to real-time operation of the actuators of the injection molding machine, operates as a web server, by way of which it is possible to make a simultaneous communication connection with two or more remote monitoring or remote maintenance workstations, a central processing unit of the stored-programmable control performing both real-time control operations of the injection molding machine and also server functions for remote monitoring or remote maintenance.

13. An injection molding machine as set forth in claim 12 wherein the stored-programmable control operates as a hyptertext transfer protocol-server.

14. An injection molding machine as set forth in claim 12 wherein the stored-programmable control operates as a file transfer protocol-server.

15. An injection molding machine as set forth in claim 12 wherein the stored-programmable control has only one central processing unit.

16. An injection molding machine as set forth in claim 12 wherein a gateway computer which operates a modem is connected to the stored-programmable control.

17. An injection molding machine as set forth in claim 16 wherein the stored-programmable control is connected to a converting computer via a serial data line and wherein the converting computer is connected to a local area network to which the gateway computer is connected.

18. An injection molding machine as set forth in claim 12 wherein a modem is operated by an interface of the stored-programmable control for data transmission.

* * * * *